UNITED STATES PATENT OFFICE.

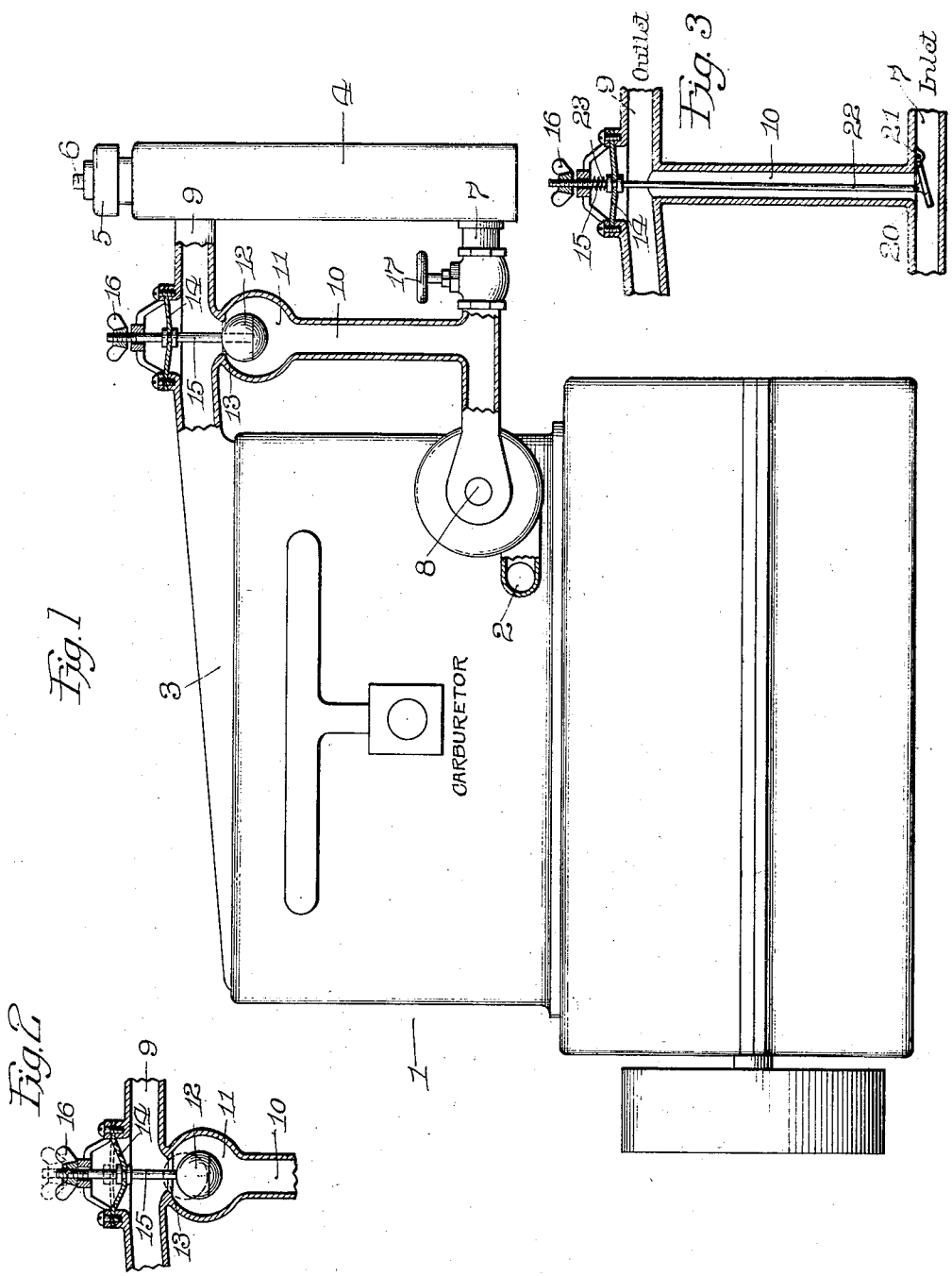

ORVILLE H. ENSIGN, OF PASADENA, CALIFORNIA.

INTERNAL-COMBUSTION ENGINE.

1,369,639.  Specification of Letters Patent.  Patented Feb. 22, 1921.

Application filed November 1, 1916. Serial No. 129,034.

*To all whom it may concern:*

Be it known that I, ORVILLE H. ENSIGN, a citizen of the United States, residing at Pasadena, in the county of Los Angeles and State of California, have invented a certain new and useful Improvement in Internal-Combustion Engines, of which the following is a full, clear, concise, and exact description, reference being had to the accompanying drawings, forming a part of this specification.

My invention relates to internal combustion engines and more particularly to a method of and means for cooling the cylinder walls of engines of this class.

While theoretical engine efficiency teaches that the cylinder walls should be kept as hot as practically possible, the requirement for lubrication demands that the walls be kept at a relatively moderate temperature. To this end various systems of cooling the cylinder walls have been defined. Chief among these has been the practice of surrounding the cylinder walls with a jacket of water. The excess heat of the walls is transferred to the water and from thence it is dissipated in two general methods—that is, either by causing the water itself to be removed and carry the heat away with it, or for the water to be passed through a heat transfer device termed a radiator where the heat is dissipated from the water and the water brought back into contact with the cylinder walls. The first method has been practised in connection with stationary and marine engine work and is not generally adapted to automobile practice. The second method is generally practised in automobile construction by means of a radiator having either forced or natural circulation.

When a gas engine is started from the cold condition, the transfer of heat to the cylinder walls is relatively free. It is so great in fact that until the walls are warmed up the engine exhibits loss of power as the heat instead of causing expansion of the working gases, is transferred to the cylinder walls and thus instead of performing work, is totally lost. The cooling water or the fluid which is then in contact with the cylinder walls, instead of being useful at this time, is a detriment in that it absorbs a very large quantity of heat and prevents the engine from doing useful work until practically all of the cooling water is heated to a temperature where loss of heat through the cylinder walls is greatly diminished.

My invention aims to provide a method of and means for cooling the walls of engine cylinders continuously under varying loads in such a manner that the walls of the engine are quickly brought up to the desired temperature and the heat which is removed from the water jacket is only that which is in excess of that necessary to keep it at a predetermined temperature.

A further object of the invention is to maintain the cylinder walls at the proper temperature under varying loads for efficient combustion of kerosene or other distillates under varying atmospheric pressures and temperatures.

A further object of the invention is to continuously maintain the thermal control of the circulating water by the vapor tension of the cooling fluid as determined by the particular atmospheric pressure prevailing.

Broadly my invention employs the relatively small quantity of water closed to the external air and maintained in contact with the cylinder walls under atmospheric pressure and when the engine is started this water is circulated very rapidly through the cooling jacket but no heat is dissipated from the relatively small amount of cooling water until all of this water has attained a certain predetermined temperature. My invention teaches that this temperature is to be governed by the vapor tension as determined by the prevailing atmospheric pressure without the escape to the atmosphere of any of the cooling liquid or vapor therefrom. After this relatively small amount of water has attained a certain predetermined temperature, the amount of water may be increased, if desired, or heat dissipating means is brought into play to remove any excess of heat which would tend to raise the water to any temperature above that predetermined by the vapor tension of the liquid at the prevailing atmospheric pressure. In order that this novel method of maintaining the appropriate temperature shall be effective to the purpose set forth it is necessary that the operation be effected by positive means that are capable of repetitious action continuously for the full period of operation of the engine. For this reason it is necessary that the vapor pressures which are depended upon for producing the desired results shall be allowed at times to exceed atmospheric pressure to a considerable extent without loss of the cooling liquid or vapors therefrom. If the vapor pressure can only operate by displacing some of the water out of the radiator and beyond automatic recovery, such depletion of cooling liquid would prevent any automatic return of the operating parts to the zero position because of an insufficient body of the cooling liquid to fill the chamber as before. By two or three operations under such conditions the apparatus would become definitely inoperative. In the present invention, therefore, care has been taken to constantly inclose the body of heat-absorbing fluid from escape of vapor or liquid to the atmosphere and only to make safety valve provision for escape at a considerable pressure, to avoid danger of excessive pressure under unexpected or abnormal conditions as will hereinafter more fully appear.

In the accompanying drawings I have illustrated one manner in which my invention may be carried out in practice.

In the accompanying drawings—

Figure 1 is a diagrammatic side elevation of an embodiment of my invention;

Fig. 2 is a fragmentary sectional view showing the temperature control valve in wide open or starting position; and Fig. 3 is a fragmentary sectional view illustrating a different form of valve mechanism.

In the drawings I have shown an internal combustion engine 1 such as is employed in automobile construction. This engine is provided with a suitable water jacket about the cylinder walls, this jacket having an inlet at 2 and an outlet manifold 3 for introducing water into and removing the same from the water jacket surrounding the cylinder wall.

I provide a radiator 4 of the air cooled automobile type which radiator is designed to maintain the cylinders in a relatively cool condition when the engine is working at full load. The radiator 4 is provided at the top with a suitable cap 5 which closes off access to the atmosphere. A safety valve 6 is provided preferably in the filling cap 5 although this safety valve may be applied at any other suitable point on the top of the radiator. This valve is set to blow at a predetermined pressure in the radiator. In the present instance this valve has been set to relieve the pressure in excess of two pounds above atmosphere.

The bottom of the radiator 4 is provided with an outlet or discharge connection 7 which is connected to the inlet of the circulating pump 8, the outlet of said pump discharging into the inlet 2 of the water jacket. The outlet manifold 3 of the water jacket is connected by a pipe 9 to the top of the radiator 4. Between the pipe 9 and the pipe 7 I provide a by-pass 10 of relatively large capacity in order to present very low frictional resistance to the flow of the cooling water therethrough. A valve chamber 11 is formed at the top of the by-pass pipe 10 and within this valve chamber a suitable valve 12 is disposed and is adapted to be brought into engagement with its seat 13 under conditions hereinafter to be described. The valve 12 is connected by a suitable stem to an operating diaphragm 14 which is subject to the pressure prevailing in the water circulating system on the inside and the prevailing atmospheric pressure on the outside. The stem 15 of the valve 12 is provided with suitable means such as the thumb nut 16 for holding the valve 12 against its seat 13 independently of the diaphragm 14. That is to say, when it is desired to remove control of the diaphragm 14, the thumb nut is drawn up so that the valve 12 is closed. By employing a suitable liquid or mixture of liquids having a suitable vapor tension under a given atmospheric pressure any temperature at which control is desired may be obtained. The pipe 7 which forms the outlet of the radiator 4 is provided with a suitable controlling valve 17 so that the resistance to the flow of water may be proportioned between the two paths.

In Fig. 2 I have shown the automatic valve in wide open position such as it will assume when the engine is starting.

In Fig. 3 I have shown a different form of valve mechanism in which a flap valve 20 is connected at the bottom of the by-pass 10 and serves to control positively the circuit through the radiator 4 and the circuit through the by-pass 10. To this end the flap valve 20 is pivoted at 21 and is connected by means of the rod 22 to the diaphragm 14. When the valve 20 is in the raised position it closes off the by-pass 10 and when it is in the lowermost position it closes off the pipe 7.

The operation of the device illustrated is as follows:

When the motor is first started the cylinder walls are relatively cold and the engine has diminished power until the same is warmed up. During this warming up period it is desirable that the radiator be put completely out of commission so that none of the heat which is given to the water jacket is dissipated at this time. It is desirable to raise the heating water to substantially boiling temperature in the shortest time possible in order to expedite the warming up process of the engine. If the water were allowed to pass through the radiator at this time it can be seen that the process of warming up would be very greatly prolonged. I therefore provide a by-pass 10 in parallel with the radiator 4, this by-pass being open during the starting period so that the cooling water, instead of being passed through the radiator, is circulated rapidly through the by-pass 10 and the water jacket of the cylinder. The resistance of the circuit through the radiator may be increased by suitable setting of the valve 17 so that the tendency for the water will be to flow freely through the by-pass 10 in preference to flowing through the restricted path including the radiator 4. The entire system which contains the cooling water is made vapor tight. As soon as the water in the water jacket and the by-pass 10 has reached the boiling temperature so that the pressure which is exerted upon the diaphragm 14 is slightly greater than atmospheric the valve 12 will begin to close. Closing or partial closing of the valve 12 causes a flow of some of the hot water through the radiator 4 where it is cooled and is then returned through the pump 8 to the water jacket about the cylinder. The parts are so proportioned that the diaphragm 14 will close the by-pass 10 at a relatively low steam pressure in the system. In the system which I have illustrated I cause the valve 12 to close at a pressure of one pound or less above atmospheric in the system.

The safety valve 6 being set for about two pounds pressure above atmosphere, and the diaphragm being constructed to operate at substantially one pound pressure above atmosphere, it can be seen that no dangerous rise in pressure can occur. The above figures which I have given are merely illustrative of the pressures at which the device may operate and it is to be understood that any other suitable pressures may be employed. Inasmuch as the pressure rises one pound for each three degrees of temperature, it can be seen that very close regulation can be secured by making the diaphragm 14 of suitable area. During normal operation a condition of balance will maintain wherein a part of the water is passed through the radiator and a part of the same through the by-pass, the mixture of the resulting water through the pump 8 being such as to maintain the cylinder walls at a substantially constant temperature.

In connection with Fig. 3, it is to be noted that other means than a radiator may be provided for dissipating the heat which is received from the cylinder walls. That is to say, a source of cold water such as the city mains or a large tank may be connected to the pipe 7 and a suitable restriction placed upon the outlet 9 so that when the vapor pressure in the system rises to a predetermined point above atmospheric or any other pressure in the system, the valve 20 will be operated to increase the supply of cold water and to decrease the amount of water that is circulated through the by-pass 10. Such suitable restriction in the pipe 9 may be provided by means of a trap or the like.

It is apparent to those skilled in the art that my invention is not to be restricted to the details of construction shown or described as modifications and substitutions can be made without departing from the spirit of the invention. It is also to be noted that the invention does not reside in the particular dimensions or proportions of the parts and that the drawings which illustrate the invention are not drawn to scale and are employed diagrammatically to make clear the nature of the invention and the manner in which it may be embodied.

I claim:

1. In combination an engine cylinder having a water jacket, an outlet pipe for said water jacket, an inlet pipe for said water jacket, a pair of conduits connected between said inlet and said outlet pipes, said conduits forming two paths in parallel for the circulation of water between said pipes, one of said pipes being adapted to dissipate the heat from the water passing through said path and means controlling the relative flow of water to said two paths, said means being a valve, and a diaphragm operating the same and governed by the vapor pressure determined by the prevailing atmospheric pressure.

2. In combination an engine cylinder having a water jacket, an outlet pipe for said water jacket, an inlet pipe for said water jacket, a pair of paths between said outlet and said inlet pipes, one of said paths comprising a radiator and means for governing the relative quantities of water passed through said two paths, said means being a valve, and a diaphragm operating the same and governed by atmospheric pressure.

3. In a combination an engine cylinder, a water jacket for said cylinder, an inlet pipe for said water jacket, an outlet pipe for said water jacket, a pair of paths connecting said pipes, said pipes, said jacket and said paths consituting a closed system, a valve controlling the relative amount of water passing through said two paths, and pressure controlled means governing said valve, said means being a diaphragm subject to atmospheric pressure and governed by the vapor pressure of the cooling water.

4. In combination an internal combustion engine having a water jacket, a radiator, a pipe connecting the top of said water jacket with the top of said radiator, a pipe connecting the bottom of said jacket with the bottom of said radiator, a by-pass connected between said pipes, all being closed to the external air, a valve controlling said by-pass and a thermally produced vapor controlled element governing said valve, operated by vapor tension and atmospheric pressure.

5. In combination, an engine cylinder having a water jacket, an outlet pipe for said jacket, an inlet pipe for said jacket, a radiator connected to said pipes, a pump connected in said inlet pipe between said radiator and said jacket, a by-pass between said outlet and said inlet pipes, and all being closed to the external air, a thermally produced vapor responsive element connected to said outlet pipe, said element controlling the relative amounts of water passing through said radiator and to said by-pass by means responsive to the vapor tension of the circulating fluid and to atmospheric pressure.

6. In combination an engine having a cylinder, a water jacket for said cylinder, an inlet pipe for said jacket, an outlet pipe for said jacket, a pump communicating with said inlet pipe, a radiator and a by-pass connected in parallel between said pipes, all being closed to the external air, and valve means governing the flow of water through said radiator, and the flow of water through said by-pass.

In witness whereof, I hereunto subscribe my name this 30th day of October, A. D. 1916.

ORVILLE H. ENSIGN.